(12) United States Patent
Murata et al.

(10) Patent No.: US 8,884,559 B2
(45) Date of Patent: Nov. 11, 2014

(54) MOTOR DRIVE DEVICE

(75) Inventors: Hiromi Murata, Kasugai (JP); Tsuyoshi Tada, Kasugai (JP); Masamitsu Hamasaki, Kasugai (JP); Taiki Yamane, Kasugai (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 790 days.

(21) Appl. No.: 13/102,201

(22) Filed: May 6, 2011

(65) Prior Publication Data

US 2011/0273122 A1 Nov. 10, 2011

(30) Foreign Application Priority Data

May 6, 2010 (JP) ................................ 2010-106100

(51) Int. Cl.
*H02H 7/09* (2006.01)
*H02P 29/00* (2006.01)

(52) U.S. Cl.
CPC ..................................... *H02P 29/00* (2013.01)
USPC ............ 318/400.22; 318/400.01; 318/400.21; 318/700

(58) Field of Classification Search
CPC .... B62D 5/0484; B62D 5/0487; B60L 3/003; H02P 29/021; H02M 1/32
USPC ................... 318/400.01, 400.21, 400.22, 700
See application file for complete search history.

(56) References Cited

U.S. PATENT DOCUMENTS

| | | | |
|---|---|---|---|
| 5,461,531 A | 10/1995 | Tuchiya et al. | |
| 6,278,256 B1 | 8/2001 | Aoyama | |
| 6,683,799 B2 | 1/2004 | Kato et al. | |
| 8,022,658 B2 | 9/2011 | Ide | |
| 2003/0117753 A1 | 6/2003 | Kato et al. | |
| 2004/0257018 A1* | 12/2004 | Tobias et al. | 318/439 |
| 2009/0066286 A1* | 3/2009 | Gunji | 318/490 |
| 2009/0195205 A1 | 8/2009 | Ide | |
| 2009/0267551 A1* | 10/2009 | Shibata | 318/400.21 |
| 2010/0079093 A1* | 4/2010 | Kitanaka | 318/400.3 |

(Continued)

FOREIGN PATENT DOCUMENTS

| | | |
|---|---|---|
| CN | 1383245 A | 12/2002 |
| CN | 101499773 A | 8/2009 |

(Continued)

OTHER PUBLICATIONS

Machine translation JP 2009-274686 A.*

(Continued)

*Primary Examiner* — Kawing Chan
(74) *Attorney, Agent, or Firm* — Osha Liang LLP (57) ABSTRACT

A motor drive device has an inverter circuit, in which at least three sets of a pair of upper and lower arms including a semiconductor switching element on an upper arm and a lower arm is arranged, for supplying voltage to a motor based on ON/OFF operation of each semiconductor switching element by a PWM (Pulse Width Modulation) signal, an inverter drive unit for outputting the PWM signal to each semiconductor switching element of the inverter circuit, a fail safe circuit, arranged between the inverter circuit and the motor, including a semiconductor switching element for shielding the voltage supply from the inverter circuit to the motor for each phase, and a fail safe drive unit for outputting a signal for turning ON/OFF the semiconductor switching element of the fail safe circuit.

5 Claims, 11 Drawing Sheets

(56) References Cited

U.S. PATENT DOCUMENTS

| | | | |
|---|---|---|---|
| 2010/0079095 A1* | 4/2010 | Shibata | 318/474 |
| 2010/0289439 A1* | 11/2010 | Kitanaka et al. | 318/400.26 |
| 2011/0285335 A1* | 11/2011 | Tada | 318/400.22 |
| 2011/0298404 A1* | 12/2011 | Okumatsu | 318/400.21 |
| 2013/0257328 A1* | 10/2013 | Arai et al. | 318/400.22 |

FOREIGN PATENT DOCUMENTS

| | | |
|---|---|---|
| JP | H07-39002 A | 2/1995 |
| JP | H08-182105 A | 7/1996 |
| JP | 9-289792 A | 11/1997 |
| JP | 2005-199746 A | 7/2005 |
| JP | 3686471 B2 | 8/2005 |
| JP | 2006-021645 A | 1/2006 |
| JP | 3884450 B2 | 2/2007 |
| JP | 2009-220705 A | 10/2009 |
| JP | 2009-274686 A | 11/2009 |

OTHER PUBLICATIONS

Office Action issued in Chinese Application No. 201110116417.0, dated Apr. 23, 2013, and translation thereof (11 pages).
English Patent Abstract of JP 9-289792 (1 page), Nov. 4, 1997.
English Patent Abstract of JP 2009-220705 (1 page), Oct. 1, 2009.
English Patent Abstract of JP 2009-274686 (1 page), Nov. 26, 2009.
English Patent Abstract of JP 2005-199746 (1 page), Jul. 28, 2005.
English Patent Abstract of JP 2006-021645 (1 page), Jan. 26, 2006.

* cited by examiner

FIG. 1

FIG. 2A
POWER SUPPLY RELAY, INVERTER CIRCUIT

FIG. 2B
FAIL SAFE CIRCUIT

FIG. 2C
U PHASE CURRENT

W PHASE CURRENT

FIG. 2D
U PHASE, MOTOR TERMINAL VOLTAGE

FIG. 2E
W PHASE, MOTOR TERMINAL VOLTAGE

OCCURRENCE OF ABNORMALITY

FIG. 7A
POWER SUPPLY RELAY, INVERTER CIRCUIT

FIG. 7B
FAIL SAFE CIRCUIT

FIG. 7C
U PHASE CURRENT

W PHASE CURRENT

FIG. 7D
U PHASE, MOTOR TERMINAL VOLTAGE

FIG. 7E
W PHASE, MOTOR TERMINAL VOLTAGE

FIG. 10A
POWER SUPPLY RELAY, INVERTER CIRCUIT

OCCURRENCE OF ABNORMALITY
t1
ON — OFF

FIG. 10B
FAIL SAFE CIRCUIT
ON — OFF

FIG. 10C
U PHASE CURRENT

W PHASE CURRENT

FIG. 10D
U PHASE, MOTOR TERMINAL VOLTAGE
— X6

FIG. 10E
W PHASE, MOTOR TERMINAL VOLTAGE
— X7

FIG. 11

MOTOR DRIVE DEVICE

BACKGROUND OF THE INVENTION

1. Technical Field

The present invention relates to a motor drive device including an inverter circuit driven by a PWM (Pulse Width Modulation) signal, and in particular, to a technique for protecting a fail safe semiconductor switching element arranged between an inverter circuit and a motor from a back electromotive force generated by the motor.

2. Related Art

In an electrical power steering device of a vehicle, an electrical motor such as a three-phase brushless motor is arranged to apply a steering assisting force corresponding to the steering torque of a handle to a steering mechanism. A motor drive device according to the PWM control method is known for the device for driving the motor.

The motor drive device of the PWM control method generally includes an inverter circuit driven by the PWM signal having a predetermined duty. The inverter circuit is configured by a so-called three-phase bridge in which three sets of a pair of upper and lower arms each having a semiconductor switching element on the upper arm and the lower arm are arranged. The voltage of each phase is supplied from the inverter circuit to the motor when each switching element is ON/OFF operated based on the PWM signal thereby driving the motor.

A motor drive device in which a fail safe mechanical relay is arranged between the inverter circuit and the motor to prevent a current from flowing from the inverter circuit to the motor (or from the motor to the inverter circuit) when failure of the circuit is detected is also known (e.g., Japanese Patent Publication No. 3686471 and Japanese Unexamined Patent Publication No. 2005-199746).

Such failure of the circuit includes various failures that occur in the motor drive device. For instance, the failure may be an ON failure in which each switching element of the inverter circuit does not change from the ON state to the OFF state and remains in the ON state, or a short circuit failure that occurs at the wiring portion other than in the switching element. In addition, there may be a failure in which an abnormality occurs inside the CPU that controls the inverter circuit and the CPU carries out a control different from the original control.

When the above-mentioned failure of the circuit is detected, a control in which the switching elements of the inverter circuit are all set to the OFF state or a control in which a power supply relay arranged between the inverter circuit and the vehicle battery is set to the OFF state is carried out. The power supply to the inverter circuit and the motor is thereby stopped, so that breakage of the inverter circuit, false operation such as assistance being carried out in the direction not predicable by the driver, or the like can be prevented.

When the failure of the circuit is detected, the driver steers the handle by human power since the steering assisting force by the motor is not applied. In this case, the motor also turns in accordance with the steering of the handle, and the motor functions as a power generator. Therefore, a large resistance is applied on the handle operation by the power generating operation of the motor when the motor and the inverter circuit remain electrically connected. That is, a great amount of force will be required to turn the handle. The fail safe mechanical relay for electrically disconnecting the inverter circuit and the motor is thus installed as in Japanese Patent Publication No. 3686471 and Japanese Unexamined Patent Publication No. 2005-199746 to prevent such drawback.

However, in the electrical power steering device, there is a demand to further miniaturize the control circuit although the supply power to the motor is large since the control circuit is to be mounted in the vehicle. Therefore, if the mechanical relay is used as in Japanese Patent Publication No. 3686471 and Japanese Unexamined Patent Publication No. 2005-199746, the relay itself becomes large and the above-mentioned demand cannot be met. A motor drive device in which a fail safe semiconductor switching element is arranged between the inverter circuit and the motor in place of the mechanical relay as described in Japanese Unexamined Patent Publication No. 2009-274686 is thus known (e.g., Japanese Unexamined Patent Publication No. 2009-274686).

In the motor drive device of Japanese Unexamined Patent Publication No. 2009-274686, an FET (Field Effect Transistor) is arranged on a power supply line between the motor and the inverter circuit, where an FET group of each power supply line and an FET group configuring the inverter circuit are both turned OFF when an abnormality such as a short-circuit occurs in the inverter circuit.

With this configuration, however, if the FET of the power supply line is turned OFF while current is flowing to the motor when the abnormality occurs, back electromotive force originating from the inductance of the motor is generated and applied on the FET as a spike voltage (instantaneous large voltage). The FET thus may break.

In Japanese Unexamined Patent Publication No. 2009-220705, a technique of protecting the semiconductor switching element from the spike voltage in the motor drive device in which a fail safe FET is arranged on the power supply line between the motor and the inverter circuit is proposed. In Japanese Unexamined Patent Publication No. 2009-220705, when the abnormality occurs, all the FETs of the inverter circuit are turned OFF, and then the current value of each phase is detected and the FET is sequentially turned OFF from the phase in which the current value becomes smaller than or equal to a predetermined reference value rather than turning OFF the fail safe FETs on the power supply line all at the same time. The spike voltage thus can be suppressed and the breakage of the FET can be prevented.

In the motor drive device of Japanese Unexamined Patent Publication No. 2009-220705, the fail safe FET of the phase in which the current value is smaller than or equal to a predetermined value is sequentially turned OFF to disconnect the inverter circuit and the motor when an abnormality occurs, and hence the current value flowing to each phase needs to be detected on a constant basis. Thus, a current detection element such as a shunt resistor is to be arranged for each phase, which enlarges the circuit. The control content is also complex as the current value of each phase is to be compared with the reference value and the OFF control is to be carried out for every fail safe FET, which leads to false operation of the circuit and makes the circuit more complex.

SUMMARY

One or more embodiments of the present invention provides a motor drive device capable of preventing the fail safe semiconductor switching element from being broken by the spike voltage with a simple circuit configuration and control operation.

A motor drive device according to one or more embodiments of the present invention includes an inverter circuit, in which at least three sets of a pair of upper and lower arms including a semiconductor switching element on an upper arm and a lower arm is arranged, for supplying voltage to a motor based on ON/OFF operation of each semiconductor switching element by a PWM signal; an inverter drive unit for outputting the PWM signal to each semiconductor switching element of the inverter circuit; a fail safe circuit, arranged between the inverter circuit and the motor, including a semiconductor switching element for shielding the voltage supply from the inverter circuit to the motor for each phase; a fail safe drive unit for outputting a signal for turning ON/OFF the semiconductor switching element of the fail safe circuit; a control unit for outputting a command signal for commanding the drive of each semiconductor switching element of the inverter circuit to the inverter drive unit, and outputting a command signal for commanding the drive of each semiconductor switching element of the fail safe circuit to the fail safe drive unit; and an abnormality detecting section for detecting an abnormality. When the abnormality detecting section detects an abnormality, the inverter drive unit carries out a control to turn OFF all the semiconductor switching elements of the inverter circuit based on the command signal from the control unit, and thereafter, the fail safe drive unit carries out a control to turn OFF all the semiconductor switching elements of the fail safe circuit based on the command signal from the control unit at a time point a predetermined time has elapsed.

According to such configuration, the semiconductor switching elements of the inverter circuit are first all turned OFF, and thereafter, the semiconductor switching elements of the fail safe circuit are all turned OFF after elapse of a predetermined time when an abnormality occurs. Thus, the back electromotive force generated by the motor is absorbed to the inverter circuit side through the semiconductor switching element in the ON state of the fail safe circuit until elapse of a predetermined time even after all the semiconductor switching elements of the inverter circuit are turned OFF. Therefore, the breakage of the element can be prevented since the spike voltage is not applied to the semiconductor switching element of the fail safe circuit. Furthermore, since the timing to turn OFF the semiconductor switching element of the fail safe circuit is to be controlled, the current value of each phase does not need to be detected on a constant basis by arranging the current detection element as in patent document 4, and the complex control is also not required.

In one or more embodiments of the present invention, the fail safe drive unit simultaneously turns OFF all the semiconductor switching elements of the fail safe circuit. The fail safe drive unit thus can easily carry out the control on the element since the semiconductor switching element does not need to be controlled individually.

In one or more embodiments of the present invention, the fail safe drive unit may maintain each semiconductor switching element of the fail safe circuit in an ON state until elapse of the predetermined time. Alternatively, the fail safe drive unit may PWM drive each semiconductor switching element of the fail safe circuit until elapse of the predetermined time.

In one or more embodiments of the present invention, a switch open/close controlled by the control unit may be arranged between the inverter circuit and a power supply for supplying power to the inverter circuit. In such a motor drive device, when the abnormality detecting section detects an abnormality, the control unit outputs a command signal for turning OFF all the semiconductor elements of the inverter circuit to the inverter drive unit, and at the same time, turns the switch to an opened state to electrically separate the inverter circuit and the power supply. Accordingly, the inverter circuit is shielded from the power supply by the switch rather than turning OFF the semiconductor switching elements of the inverter circuit with only the command from the inverter drive unit, so that the inverter circuit reliably achieves the operation stop state and the safety is enhanced.

In one or more embodiments of the present invention, each semiconductor switching element of the inverter circuit and the fail safe circuit is an N channel MOS-FET. The back electromotive force generated in the motor thus can be easily absorbed to the inverter circuit side using the parasitic diode between the source and the drain of the MOS-FET. The N channel MOS-FET has an advantage in that the circuit design is easy compared to the P channel MOS-FET.

According to one or more embodiments of the present invention, the semiconductor switching element for fail safe can be prevented from breaking by the spike voltage with the simple circuit configuration and the control operation.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. A motor drive device used in an electrical power steering device of a vehicle will be described by way of example. In the figures, the same reference numerals are denoted for the same portions or corresponding portions.

Figure 1:
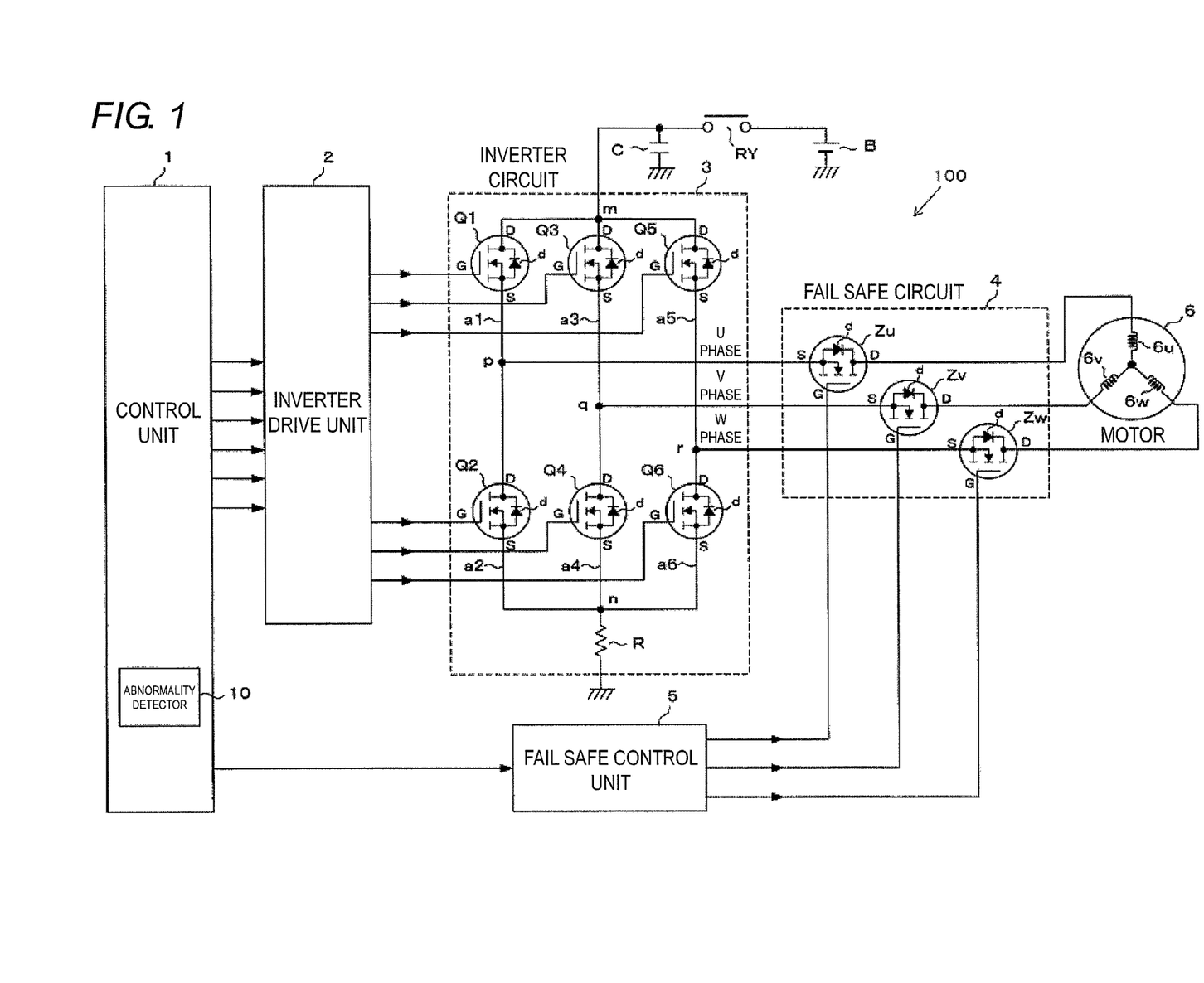
FIG. 1 is a circuit diagram of a motor drive device according to one or more embodiments of the present invention.

First, the configuration of a motor drive device according to a first embodiment of the present invention will be described with reference to FIG. 1. In FIG. 1, a motor drive device 100 includes a control unit 1, an inverter drive unit 2, an inverter circuit 3, a fail safe circuit 4, a fail safe drive unit 5, a capacitor C, a power supply relay RY, and a power supply B. The power supply relay RY is an example of a switch in one or more embodiments of the present invention. A motor 6 driven by the motor drive device 100 is a three-phase brushless motor.

The inverter circuit 3 is configured by a three-phase bridge in which three sets of a pair of upper and lower arms including a semiconductor switching element (hereinafter simply referred to as "switching element") on an upper arm and a lower arm are arranged in correspondence with a U phase, a V phase, and a W phase. An upper arm a1 and a lower arm a2 of the U-phase respectively include a switching element Q1 and Q2, an upper arm a3 and a lower arm a4 of the V phase respectively include a switching element Q3 and Q4, and an upper arm a5 and a lower arm a6 of the W phase respectively include a switching element Q5 and Q6. A U-phase voltage is retrieved from a connection point p of the switching elements Q1 and Q2, a V-phase voltage is retrieved from a connection point q of the switching elements Q3 and Q4, and a U-phase voltage is retrieved from a connection point r of the switching elements Q5 and Q6.

In the first embodiment, the switching elements Q1 to Q6 are configured by an N-channel MOS-FET. In each switching element, S represents source, D represents drain, G represents gate, and d represents parasitic diode existing between the source S and the drain D. A conducting direction of the parasitic diode d is the direction opposite to the conducting direction (drain D→source S) of each switching element Q1 to Q6. Each drain D of the switching elements Q1, Q3, and Q5 are commonly connected, and a connection point m thereof is connected to a power supply B through the power supply RY. The capacitor C is connected between the connection point m thereof and ground. Each source S of the switching element Q2, Q4, and Q6 are commonly connected, and a connection point n thereof is connected to the ground through a current detection resistor R. The power is supplied from the power supply B to the inverter circuit 3 through the power supply relay RY.

Six types of PWM signals output from the inverter drive unit 2 are individually provided to each gate G of the switching element Q1 to Q6 of the inverter circuit 3. The switching elements Q1 to Q6 perform the ON/OFF operation based on the PWM signal, and as a result, three phase voltage of the U phase voltage, the V phase voltage, and the W phase voltage described above are output from the inverter circuit 3. The three phase voltage is supplied to the motor 6 through the fail safe circuit 4.

The fail safe circuit 4 is arranged between the inverter circuit 3 and the motor 6, and includes a switching element Zu on a power supply line of the U phase voltage, a switching element Zv on a power supply line of the V phase voltage, and a switching element Zw on a power supply line of the W phase voltage. In the first embodiment, each switching element Zu, Zv, and Zw is configured by an N-channel MOS-FET, similar to the switching elements Q1 to Q6 of the inverter circuit 3. In each switching element, S represents source, D represents drain, G represents gate, and d represents parasitic diode existing between the source S and the drain D. A conducting direction of the parasitic diode d is the direction opposite to the conducting direction (drain D→source S) of each switching element Zu, Zv, and Zw.

The source S of the switching element Zu is connected to a connection point p of the switching elements Q1 and Q2, the source S of the switching element Zv is connected to a connection point q of the switching element Q3 and Q4, and the source S of the switching element Zw is connected to a connection point r of the switching elements Q5 and Q6. The drain D of the switching element Zu is connected to a U phase winding 6u of the motor 6, the drain D of the switching element Zv is connected to a V phase winding 6v of the motor 6, and the drain D of the switching element Zw is connected to a W phase winding 6w of the motor 6.

A control signal is input from the fail safe drive unit 5 to each gate G of the switching elements Zu, Zv, and Zw of the fail safe circuit 4. The fail safe drive unit 5 outputs the control signal of "H" (High) level when turning ON the switching elements Zu, Zv, and Zw, and outputs the control signal of "L" (Low) level when turning OFF the switching elements Zu, Zv, and Zw. The switching elements Zu, Zv, and Zw carry out the ON/OFF operation based on the control signal. The power supply from the inverter circuit 3 to the motor 6 is carried out when the switching elements Zu, Zv, and Zw are in the ON state, and the power supply from the inverter circuit 3 to the motor 6 is shielded when the switching elements Zu, Zv, and Zw are in the OFF state.

The control unit 1 is configured by a CPU, a memory, or the like, and includes an abnormality detector 10. The abnormality detector 10 is an example of an abnormality detecting section in one or more embodiments of the present invention. The control unit 1 calculates a detection current value of a motor current based on the voltage generated at the current detection resistor R, and calculates a target current value of the motor current based on a steering torque input from a torque sensor (not shown). The duty of the PWM signal of each phase is set from the detection current value and the target current value, and a command signal for generating the PWM signal of the relevant duty is output to the inverter drive unit 2. When the abnormality detector 10 detects an abnormality such as short-circuit failure, the control unit 1 carries out a control, to be described later, on the power supply relay RY, the inverter drive unit 2, and the fail safe drive unit 5.

The inverter drive unit 2 generates six types of PWM signal having a predetermined duty based on the command signal provided from the control unit 1, and outputs the PWM signal to the gate G of each switching element Q1 to Q6 of the inverter circuit 3.

Figure 2A:
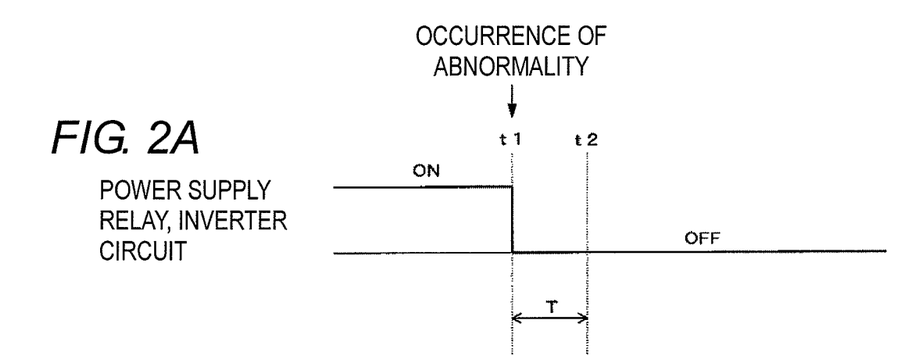
FIGS. 2A to 2E are timing charts showing the operation of the motor drive device according to a first embodiment.
Figure 2B:
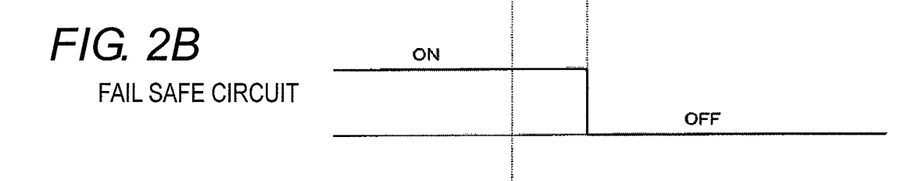

The operation of the motor drive device 100 described above will now be described with reference to FIGS. 2A to 2E to FIG. 5. In timing chart of FIGS. 2A to 2E, an abnormality does not occur in the circuit before time 1, where both the power supply relay RY and the inverter circuit 3 are in the ON state as shown in FIG. 2A, and the fail safe circuit 4 is also in the ON state as shown in FIG. 2B.

In other words, if the abnormality detector 10 does not detect an abnormality, the control unit 1 controls the power supply relay RY to the closed state (ON). The control unit 1 outputs a command signal to the inverter drive unit 2, and turns ON a predetermined element of the switching elements Q1 to Q6 to have the inverter circuit 3 in the operation state. Furthermore, the control unit 1 outputs a command signal to the fail safe drive unit 5 and turns ON all the switching elements Zu, Zv, and Zw to have the fail safe circuit 4 in the conducted state.

Figure 2C:
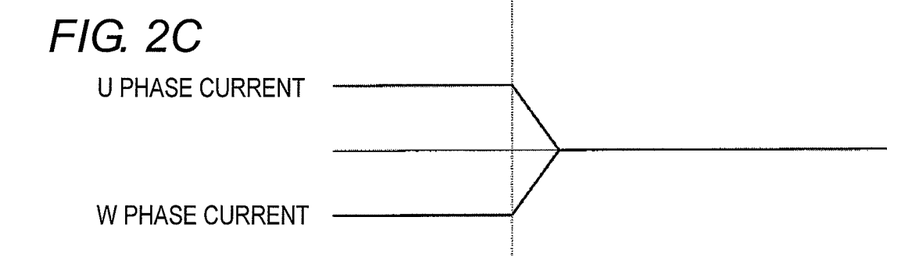
Figure 2D:
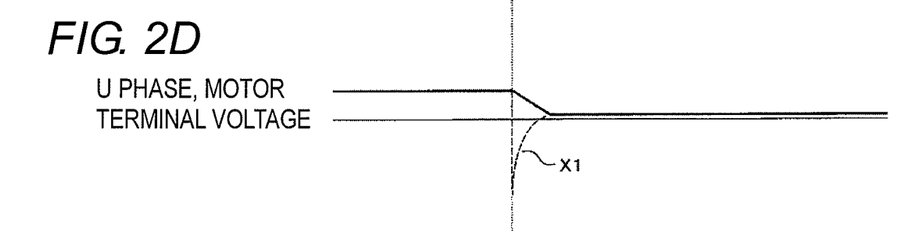
Figure 2E:
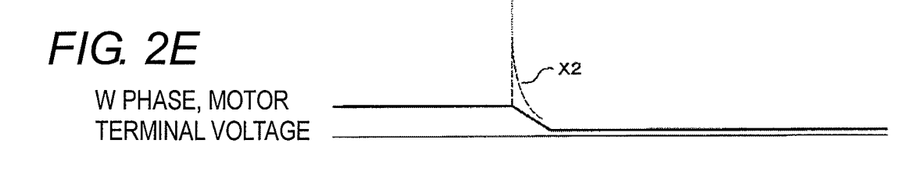
Figure 3:
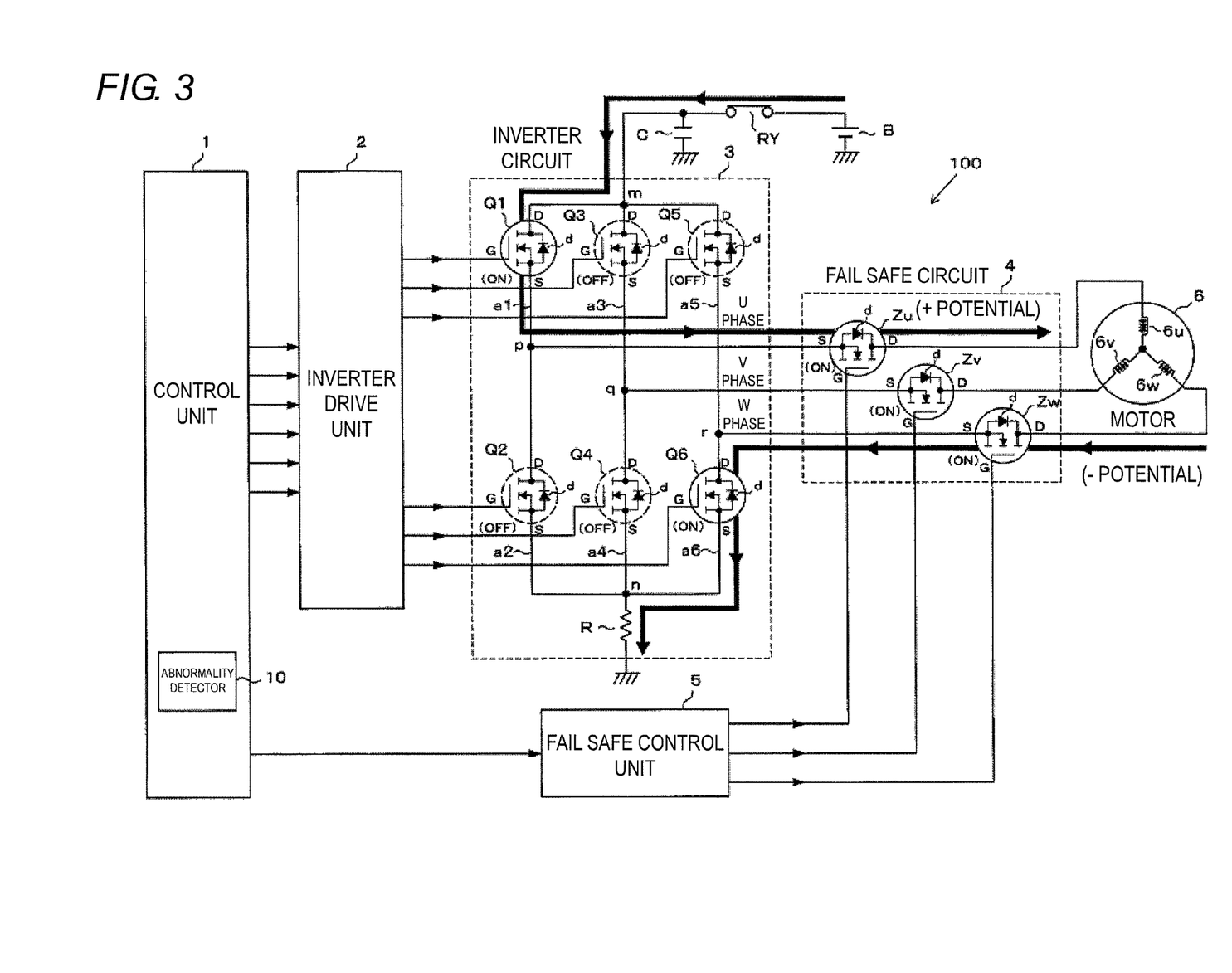
FIG. 3 is a view showing a current path in normal time.

In this state (normal time), a current path (thick line) as shown in FIG. 3 is formed. The current path in a case where the switching elements Q1 and Q6 of the inverter circuit 3 are turned ON is shown. In FIG. 3, the U phase current flows in the path of power supply B→power supply relay RY→switching element Q1 (drain D to source S)→parasitic diode d of switching element Zu→U phase winding 6u of motor 6. The W phase current flows in the path of W phase winding 6w of motor 6→switching element Zw (drain D to source S)→switching element Q6 (drain D to source S) current detection resistor R→ground. FIG. 2C shows the U phase current and the W phase current. FIG. 2D shows the U phase voltage applied to the terminal of the U phase winding 6u of the motor 6, and FIG. 2E shows the W phase voltage applied to the terminal of the W phase winding 6w of the motor 6. The U phase voltage and the W phase voltage are actually PWM controlled pulse voltages but are expressed as DC voltage for the sake of convenience in the figure.

The operation in a case where an abnormality occurs will now be described. When the abnormality detector 10 detects an abnormality such as a short circuit failure, the control unit 1 switches the power supply relay RY from the closed state (ON) to the opened state (OFF), and outputs a command signal for stopping the operation of the inverter circuit 3 to the inverter drive unit 2. The inverter circuit 3 and the power supply B are electrically separated when the power supply relay RY is switched to the opened state. The inverter drive unit 2 stops the output of the PWM signal to the inverter circuit 3 based on the command signal from the control unit 1. The switching elements Q1 to Q6 of the inverter circuit 3 are then all turned OFF.

However, the current may flow from the inverter circuit 3 to the motor 6 even if a control to have the power supply relay RY and the switching elements Q1 to Q6 in the OFF state is carried out if the relay and the circuit break down. To inhibit this, all the switching elements Zu, Zv, and Zw of the fail safe circuit 4 are turned OFF to shield the inverter circuit 3 and the motor 6 so that the fail safe function can be ensured.

Figure 10A:
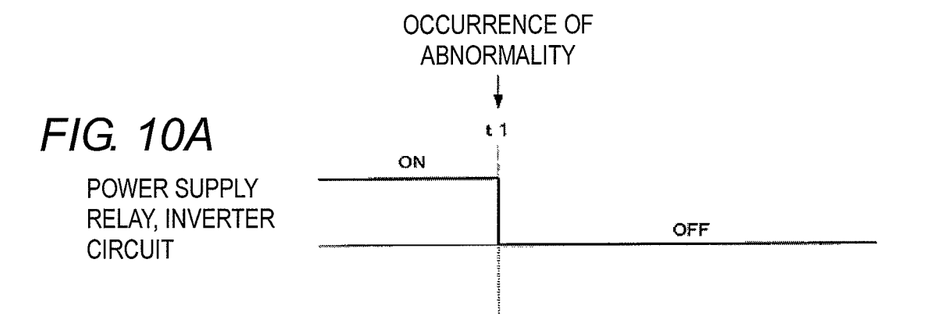
FIGS. 10A to 10E are timing charts showing the operation of the motor drive device according to a comparative example.
Figure 10B:
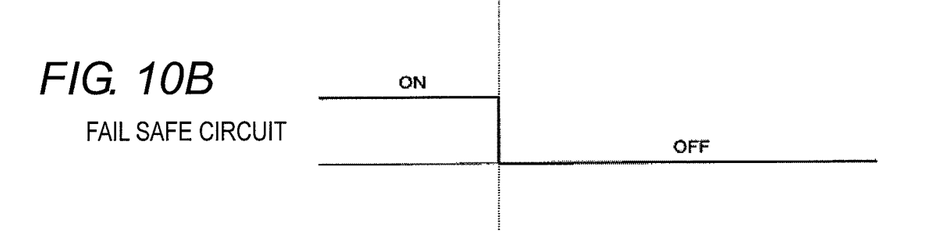

As shown in FIGS. 10A and 10b describing the comparative example, if the fail safe circuit 4 is turned OFF at the timing t1 same as the timing t1 to turn OFF the inverter circuit 3, the switching element of the fail safe circuit 4 may break down from the back electromotive force generated in the motor 6. This will be specifically described below.

Figure 11:
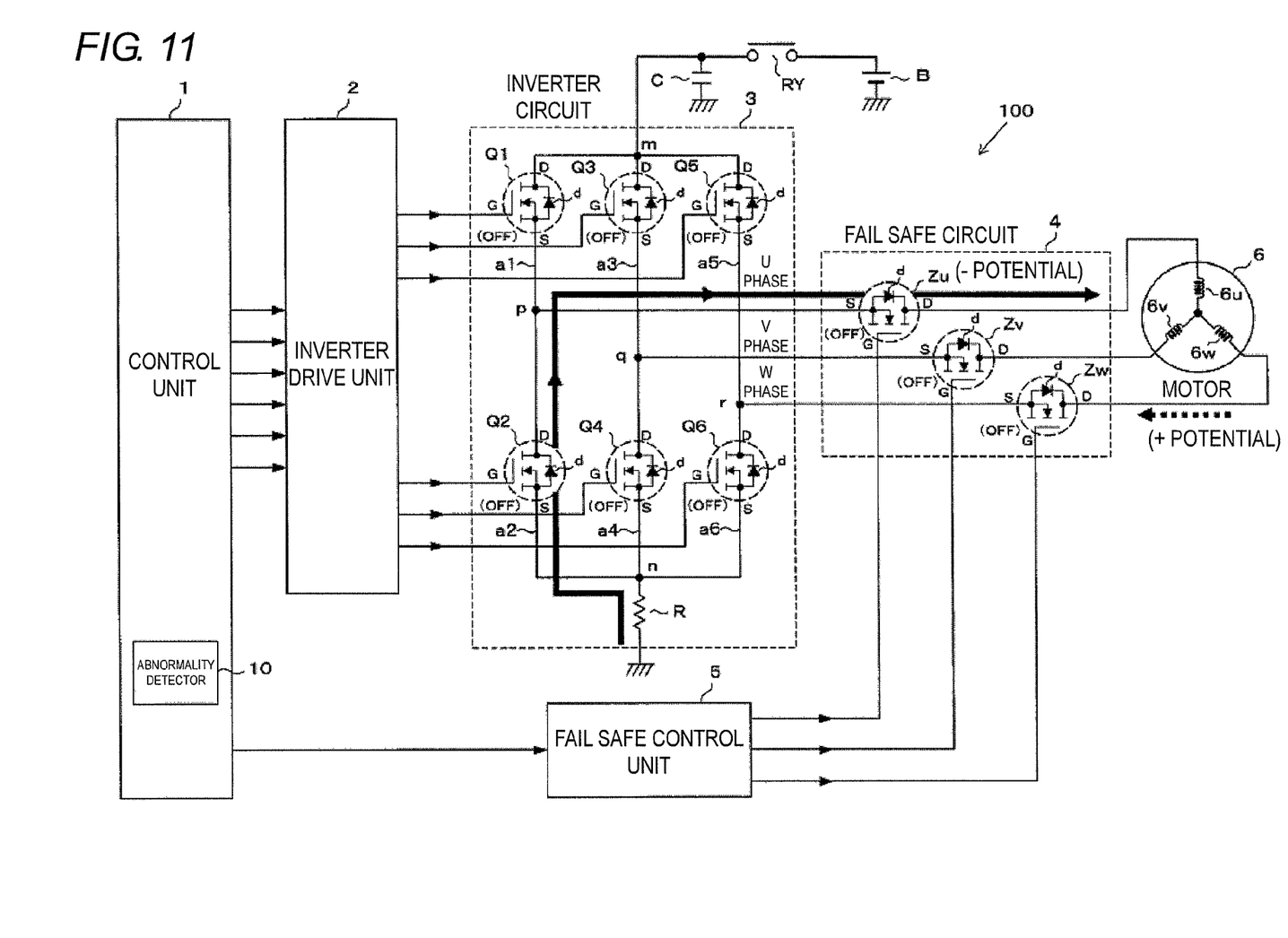
FIG. 11 is a view showing a current path at the time of abnormality in the comparative example.

FIG. 11 shows a path of the current flowing based on the back electromotive force when the switching elements Zu, Zv, and Zw of the fail safe circuit 4 are turned OFF at the same time as when the switching elements Q1 to Q6 of the inverter circuit 3 are turned OFF when an abnormality occurs from the normal state shown in FIG. 3. The polarity of the terminal of the U phase winding 6u in the motor 6 inverts from + to − in FIG. 3 and the polarity of the terminal of the W phase winding 6w inverts from − to + in FIG. 3 due to the back electromotive force.

As a result, the current path of ground→current detection resistor R→parasitic diode d of switching element Q2→parasitic diode d of switching element Zu→U phase winding 6u of motor 6 is formed, as shown with a thick solid line for the U phase, so that the back electromotive force generated in the motor 6 is absorbed by the current path. Therefore, a large spike voltage will not be applied to the switching element Zu of the U phase.

For the W phase, the path of the thick dotted line is not formed since the conducting direction of the parasitic diode d of the switching element Zw is the opposite of the current direction even if the current attempts to flow as shown with a thick dotted line from the W phase winding 6w of the motor 6 to the inverter circuit 3. Therefore, the back electromotive force of + polarity in the W phase winding 6w is not absorbed, a large spike voltage is applied to the switching element Zw, and the switching element Zw is broken.

Figure 10C:
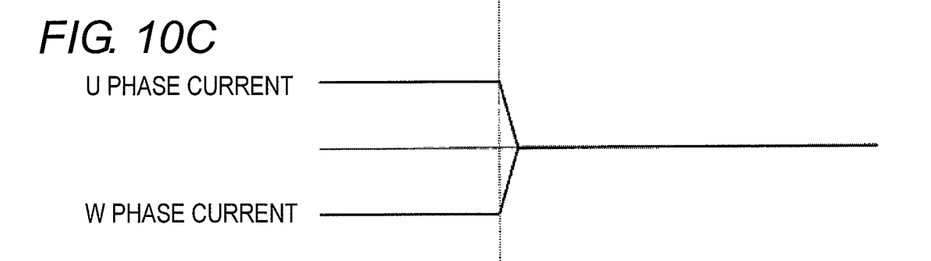
Figure 10D:
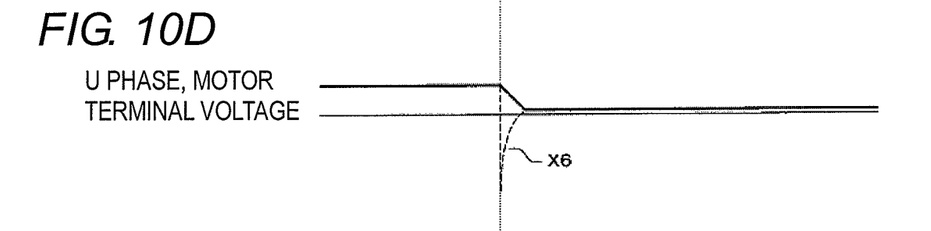
Figure 10E:
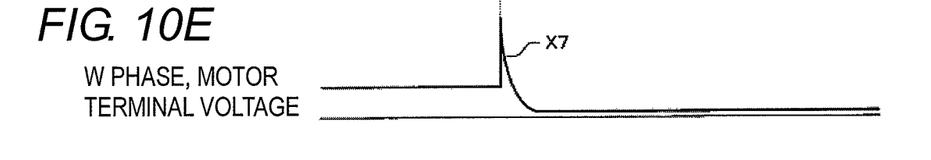

Describing the above phenomenon with FIGS. 10A to 10E, the U phase current and the Q phase current of the motor 6 rapidly decrease as shown in FIG. 10C when the switching elements Zu, Zv, and Zw of the fail safe circuit 4 are turned OFF at the same time as when the switching elements Q1 to Q6 of the inverter circuit 3 are turned OFF. The back electromotive force generated in the motor 6 increases as the change rate (di/dt) of the current becomes greater, and hence a large back electromotive force is generated by the rapid current change as shown in FIG. 10C. However, the absorption path of the back electromotive force is formed for the U phase, so that the spike voltage X6 is not generated as shown in FIG. 10D in the U phase voltage. The absorption path of the back electromotive force is not formed for the W phase, as described above, and thus the spike voltage X7 is generated as shown in FIG. 10E in the W phase voltage.

In the first embodiment, the fail safe circuit 4 is turned OFF at time t2, at which a predetermined time T has elapsed from the time t1 the abnormality occurs and the power supply relay RY and the inverter circuit 3 are turned OFF, as shown in FIGS. 2A and 2B, to prevent element breakage by the spike voltage. This control operation will be specifically described below.

When the abnormality detector 10 detects an abnormality at time t1, the control unit 1 causes the power supply relay RY to be in the opened state (OFF) and outputs a command signal for turning OFF the switching elements Q1 to Q6 to the inverter drive unit 2. The inverter drive unit 2 stops the output of the PWM signal to the inverter circuit 3 when receiving the command signal. In other words, the inverter drive unit 2 performs a control to turn OFF all the switching elements Q1 to Q6. The switching elements Q1 to Q6 of the inverter circuit 3 are then all turned OFF.

Here, the abnormality assumes an abnormality in the CPU or the like of the control unit 1. The switching elements Q1 to Q6 of the inverter circuit 3 are all assumed to be able to carry out the ON/OFF operation normally. Other abnormalities include the ON failure in which one of the switching elements Q1 to Q6 of the inverter circuit 3 remains in the ON state, the illustration of which is omitted.

Furthermore, the control unit 1 outputs a command signal for turning OFF the switching elements Zu, Zv, and Zw to the fail safe drive unit 5 at a time point of time t2, at which a predetermined time T has elapsed from the time t1. When receiving the command signal, the fail safe drive unit 5 outputs the control signal of "L" level to each gate G of the switching elements Zu, Zv, and Zw of the fail safe circuit 4. In other words, the fail safe drive unit 5 performs a control to turn OFF all the switching elements Zu, Zv, and Zw. The switching elements Zu, Zv, and Zw of the fail safe circuit 4 are then all turned OFF.

Figure 4:
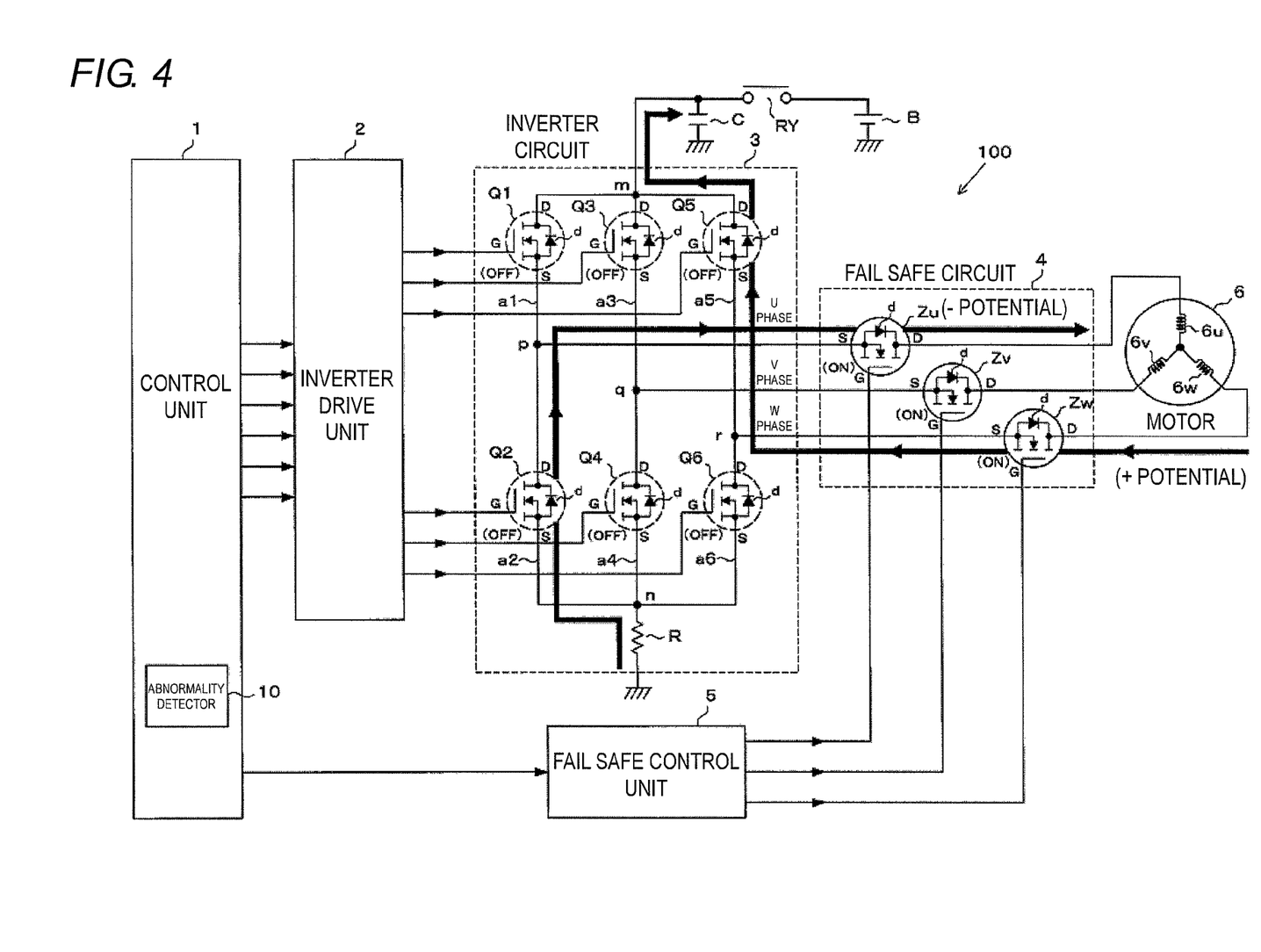
FIG. 4 is a view showing a current path in abnormal time.

Therefore, the switching elements Q1 to Q6 of the inverter circuit 3 are all turned OFF and all the switching elements Zu, Zv, and Zw of the fail safe circuit 4 are all turned ON between time t1 and time t2. Thus, the current path shown with a thick line in FIG. 4 is formed when an abnormality occurs from the normal state shown in FIG. 3.

In other words, similar to the case of FIG. 11, the current path of ground→current detection resistor R→parasitic diode d of switching element Q2→parasitic diode d of switching element Zu→U phase winding 6u of motor 6 is formed for the U phase, and the back electromotive force generated in the motor 6 is absorbed to the inverter circuit 3 side by the current path. For the W phase, the current path of W phase winding 6w→switching element Zw (drain D to source S)→parasitic diode d of switching element Q5→capacitor C→ground is formed since the switching element Zw is turned ON, and the back electromotive force generated in the motor 6 is absorbed to the inverter circuit 3 side by the current path.

As the switching elements Zu, Zv, and Zw of the fail safe circuit 4 are maintained in the ON state until the elapse of the predetermined time T from when the switching elements Q1 to Q6 of the inverter circuit 3 are turned OFF, the back electromotive force generated in the motor 6 at the time of abnormality can be absorbed to the inverter circuit 3 side through the fail safe circuit 4. As a result, the U phase current and the W phase current of the motor 6 gradually is reduced as shown in FIG. 2C. Therefore, the spike voltage X1 is not generated in the U phase voltage as shown in FIG. 2D, and the spike voltage X2 is also not generated in the W phase voltage as shown in FIG. 2E. Therefore, a large spike voltage is not applied to the switching elements Zu, Zw, and the breakage of the element can be prevented.

Figure 5:
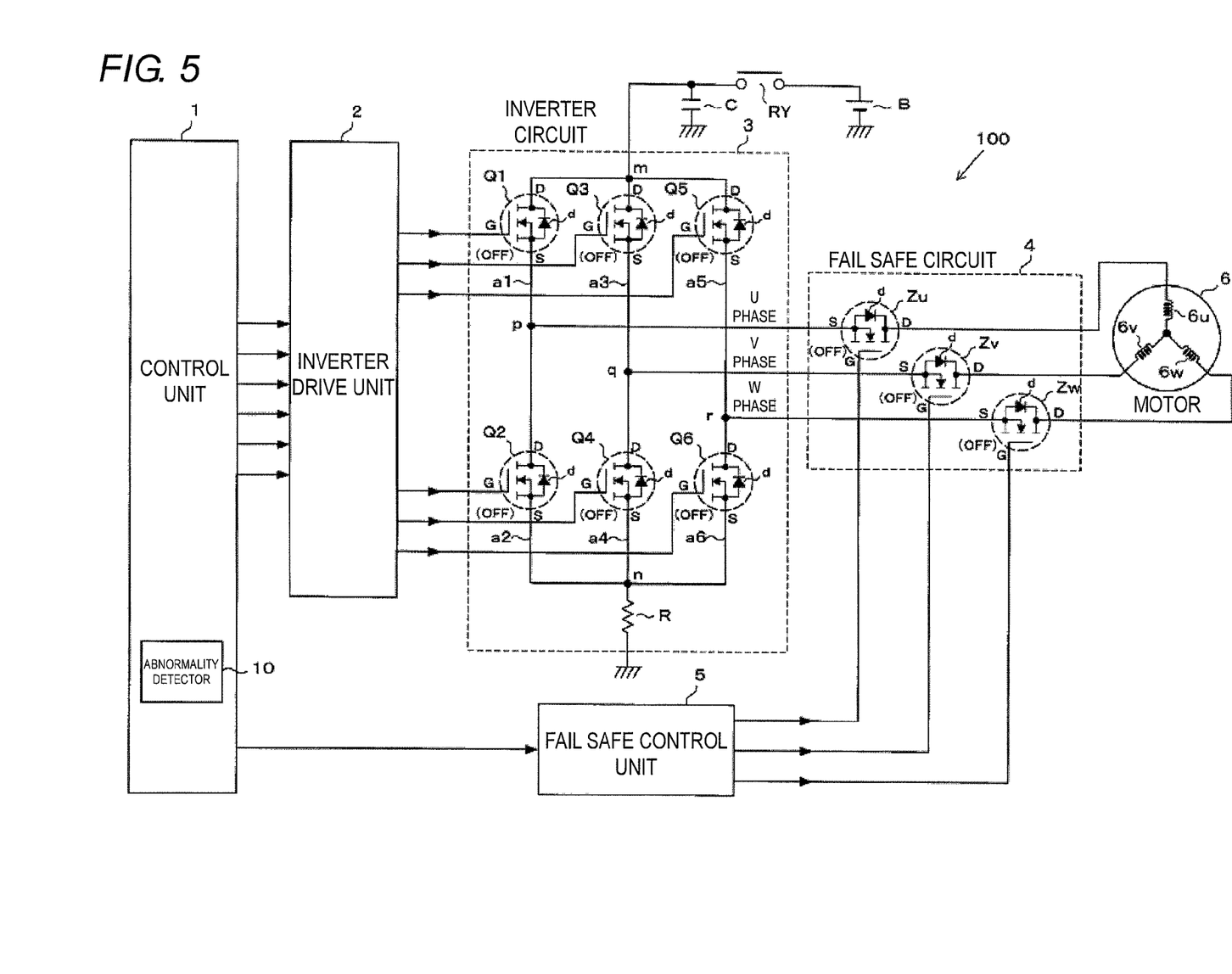
FIG. 5 is a view showing a state in which an inverter circuit and a motor are shielded.

When the predetermined time T has elapsed and becomes time t2, the switching elements Zu, Zv, and Zw of the fail safe circuit 4 are all turned OFF simultaneously. As a result, the power supply relay RY, the switching elements Q1 to Q6 of the inverter circuit 3 and the switching elements Zu, Zv, and Zw of the fail safe circuit 4 are all in the OFF state, as shown in FIG. 5, so that the motor 6 can be reliably cut off from the motor drive device 100.

The current path in a case where the U phase voltage and the W phase voltage appear has been described above using an example in which Q1 and Q6 of the switching elements of the inverter circuit 3 are turned ON, but similar principle can be applied to the current path in a case where the U phase voltage and the V phase voltage appear, and the current path in a case where the V phase voltage and the W phase voltage appear.

The predetermined time T can be determined as below. Generally, the avalanche energy $E_{AV}$ generated when disconnecting the motor load is $$E_{AV} = \tfrac{1}{2} \cdot L \cdot I^2 \cdot [V_{DSS}/(V_{DSS} - V_{BAT})]$$

Where I is the motor current, L is the inductance of the motor, $V_{DSS}$ is the drain-source withstanding pressure rated value, and $V_{BAT}$ is the battery voltage, and the discharge time $t_{AV}$ of the avalanche energy $E_{AV}$ is $$t_{AV} = (L \cdot I)/(V_{DSS} - V_{BAT})$$

Therefore, the predetermined time T is determined to satisfy $t_{AV} \leq T$. For the upper limit of T, disconnecting the motor from the inverter circuit within a defined time when an abnormality occurs is decided in the specification of the vehicle, and hence the defined time becomes the upper limit.

The regenerative operation is carried out while the back electromotive force of the motor 6 is absorbed to the inverter circuit 3 side at the time of abnormality, so that an electrical brake is applied on the motor 6 thus causing the steering to be heavy in theory, but actually, the steering is barely affected since the time T is a small value of smaller than or equal to a 1 ms (millisecond).

Figure 6:
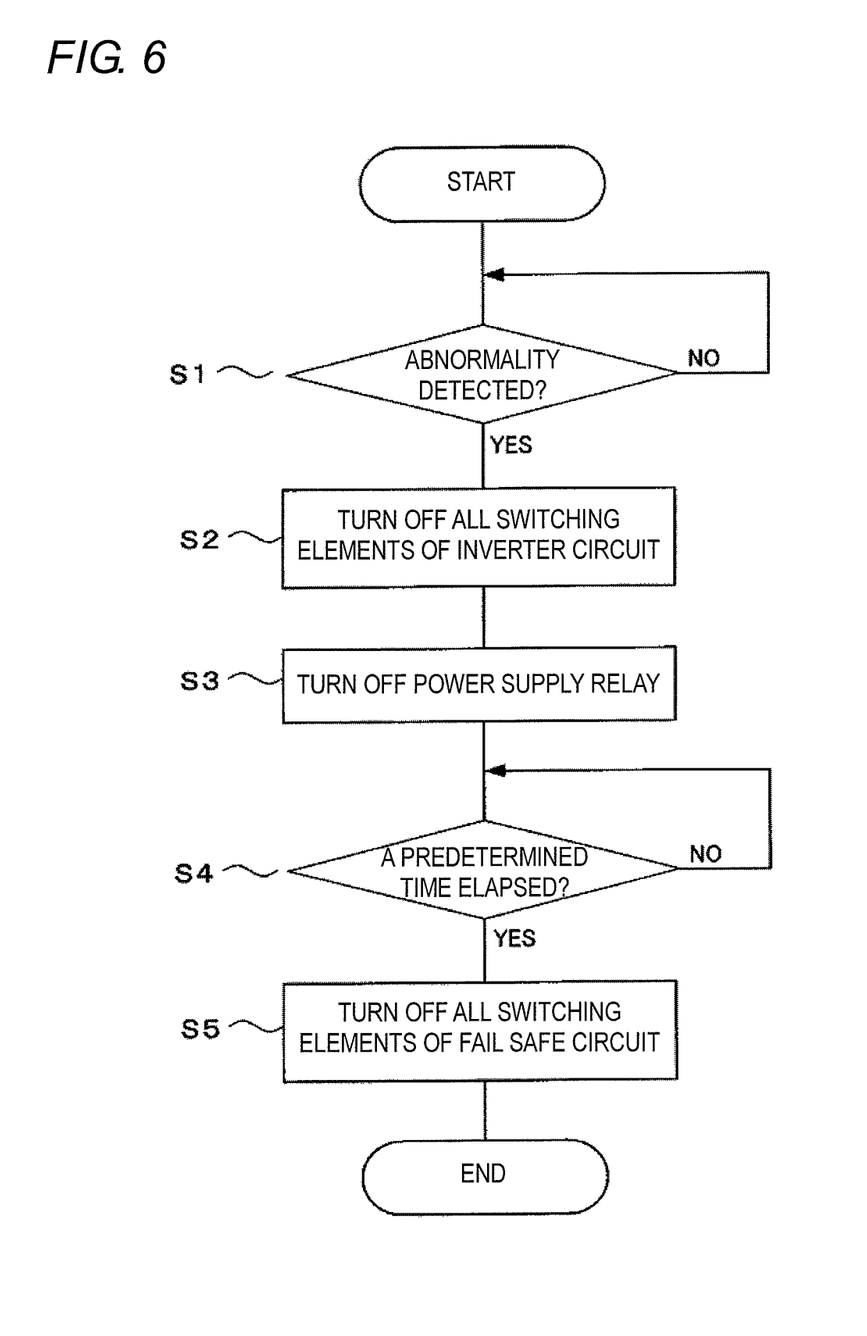
FIG. 6 is a flowchart showing the procedures of the control by the first embodiment.

FIG. 6 is a flowchart showing the procedure of the control according to the first embodiment described above. Each step of the flowchart is executed by the CPU configuring the control unit 1.

In FIG. 6, in step S1, the abnormality detector 10 monitors whether or not an abnormality is detected. Step S1 is repeatedly executed if the abnormality detector 10 does not detect an abnormality (step S1: NO), and the process proceeds to steps S2, S3 if the abnormality detector 10 detects an abnormality (step S1: YES). In step S2, all the switching elements Q1 to Q6 of the inverter circuit 3 are turned OFF, and at the same time, the power supply relay RY is set to the opened state (OFF) in step S3. The time is measured from this time point with a timer (not shown) arranged in the control unit 1 to determine whether or not a predetermined time T has elapsed in step S4. Step S4 is repeatedly executed if the predetermined time T has not elapsed (step S4: NO), and the process proceeds to step S5 if the predetermined time T has elapsed (step S4: YES) to turn OFF all the switching elements Zu, Zv, and Zw of the fail safe circuit 4.

According to the first embodiment described above, the back electromotive force generated in the motor 6 is absorbed to the inverter circuit 3 side through the fail safe circuit 4, so that the switching elements Zu, Zv, and Zw of the fail safe circuit 4 are prevented from being broken by a large spike voltage. Furthermore, since the timing to turn OFF the switching elements Zu, Zv, and Zw of the fail safe circuit 4 is to be controlled, the processes such as arranging a current detection element to detect the current value of each phase on a constant basis, and comparing the detection current value with a reference value, and the like become unnecessary and a simple control merely needs to be carried out as shown in FIG. 6.

According to the first embodiment, the fail safe drive unit 5 does not need to individually control the switching elements Zu, Zv, and Zw by turning OFF all the switching elements Zu, Zv, and Zw of the fail safe circuit 4 simultaneously, and hence the control with respect to the element can be easily carried out.

According to the first embodiment, the control unit 1 not only outputs the command signal for turning OFF the inverter circuit 3 but also controls the power supply relay RY to the opened state at the same time when the abnormality occurs, and hence the inverter circuit 3 is electrically separated from the power supply B. Therefore, the inverter circuit 3 reliably becomes the operation stop state and the safety is enhanced.

Moreover, according to the first embodiment, the switching elements of the inverter circuit 3 and the fail safe circuit 4 are configured by an N-channel MOS-FET. Therefore, the back electromotive force generated in the motor 6 can be easily absorbed to the inverter circuit 3 side using the parasitic diode d existing between the drain and the source of each FET. The N-channel MOS-FET has an advantage in that the circuit design is easier than the P-channel MOSFET.

A second embodiment of the present invention will now be described with reference to FIGS. 7A to 7E to FIG. 9. The configuration of the motor drive device according to the second embodiment is the same as FIG. 1, and the current path at normal time is also the same as shown in FIG. 3, and thus FIG. 1 and FIG. 3 will be cited as second embodiment.

Figure 7A:
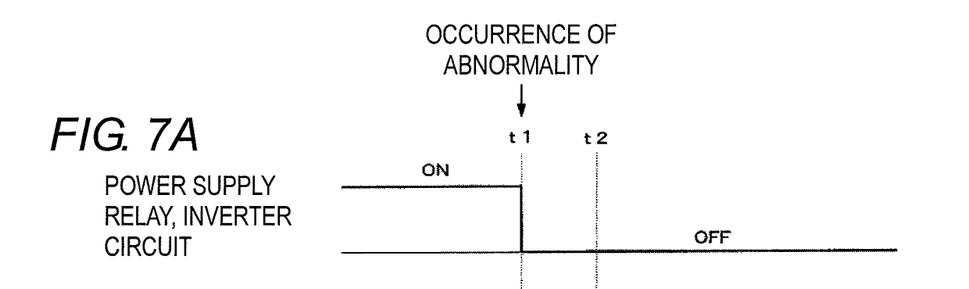
FIGS. 7A to 7E are timing charts showing the operation of the motor drive device according to a second embodiment.
Figure 7B:
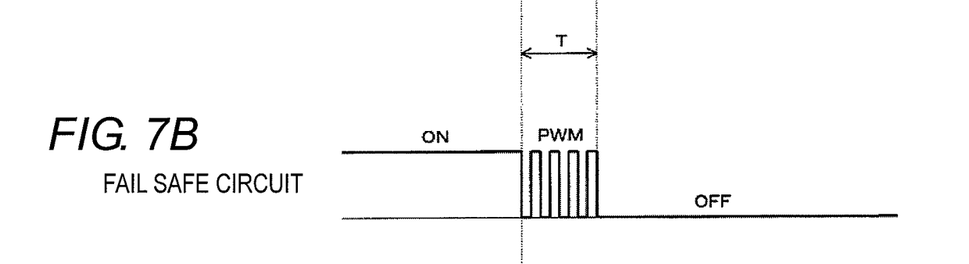

As shown in FIG. 7B, in the second embodiment, the switching elements Zu, Zv, and Zw of the fail safe circuit 4 are PWM driven until the elapse of the predetermined time T from time t1 at which the abnormality occurred. In other words, at the time point of time t1, the control unit 1 outputs a command signal for PWM driving the switching elements Zu, Zv, and Zw to the fail safe drive unit 5. When receiving the command signal, the fail safe drive unit 5 generates a PWM signal and outputs the command signal to the fail safe circuit 4. In the second embodiment, the PWM signal having a constant (does not change with time) duty is generated by the fail safe drive unit 5, and provided to each gate G of the switching elements Zu, Zv, and Zw. The switching elements Zu, Zv, and Zw carry out the ON/OFF operation according to such PWM signal.

Therefore, the switching elements Q1 to Q6 of the inverter circuit 3 are all turned OFF, but the switching elements Zu, Zv, and Zw of the fail safe circuit 4 repeat the ON/OFF operation from time t1 to time t2. Thus, the back electromotive force generated by the motor 6 is absorbed to the inverter circuit 3 side through the fail safe circuit 4 in the zone in which the switching element is turned ON, similar to the first embodiment.

Figure 7C:
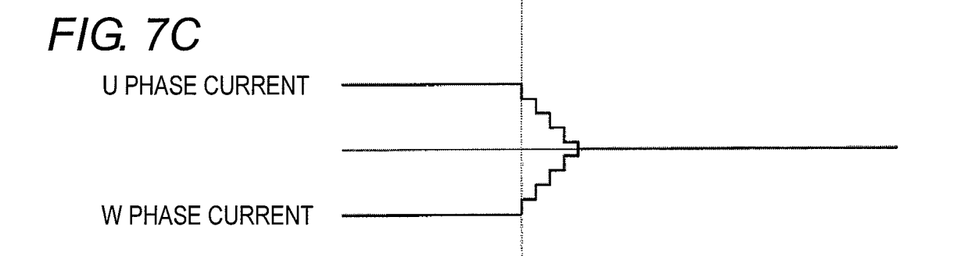
Figure 7D:
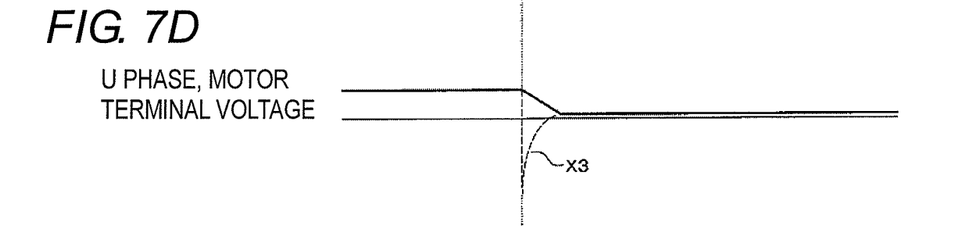
Figure 7E:
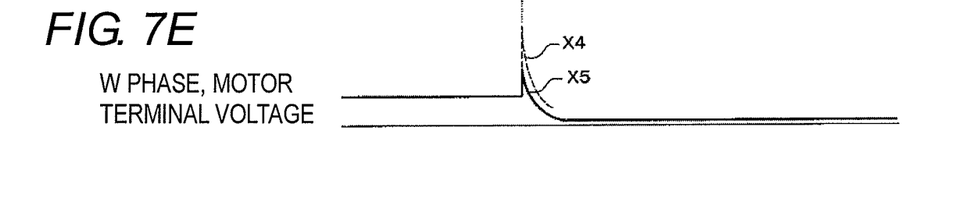
Figure 8:
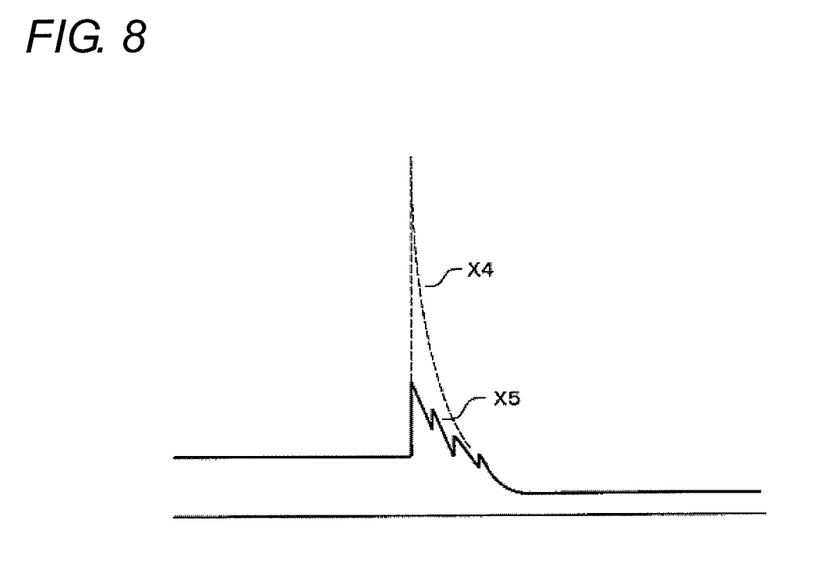
FIG. 8 is an enlarged view of the waveform of the spike voltage.

As a result, the U phase current and the W phase current of the motor 6 shown in FIG. 7C decrease in a step-wise manner according to the PWM operation of the switching elements Zu, Zv, and Zw. Therefore, the spike voltage X3 is not generated in the U phase voltage as shown in FIG. 7D, and the spike voltage X4 is not generated in the W phase voltage as shown in FIG. 7E. However, the PWM driven switching element has a zone that is turned OFF, and hence a situation where the back electromotive force cannot be absorbed occurs similar to FIG. 11 in the OFF period of the switching element Zw. Thus, the spike voltage shown as X5 in FIG. 7E is instantaneously applied to the switching element Zw. FIG. 8 is an enlarged view of the waveform of the spike voltage X5.

The spike voltage X5 in this case has a small peak value compared to the original spike voltage X4. Therefore, the element breakage by the spike voltage X5 can be prevented by setting the duty of the PWM signal so that the peak value becomes a value of an extent that the breakage of the switching element Zw does not occur.

Figure 9:
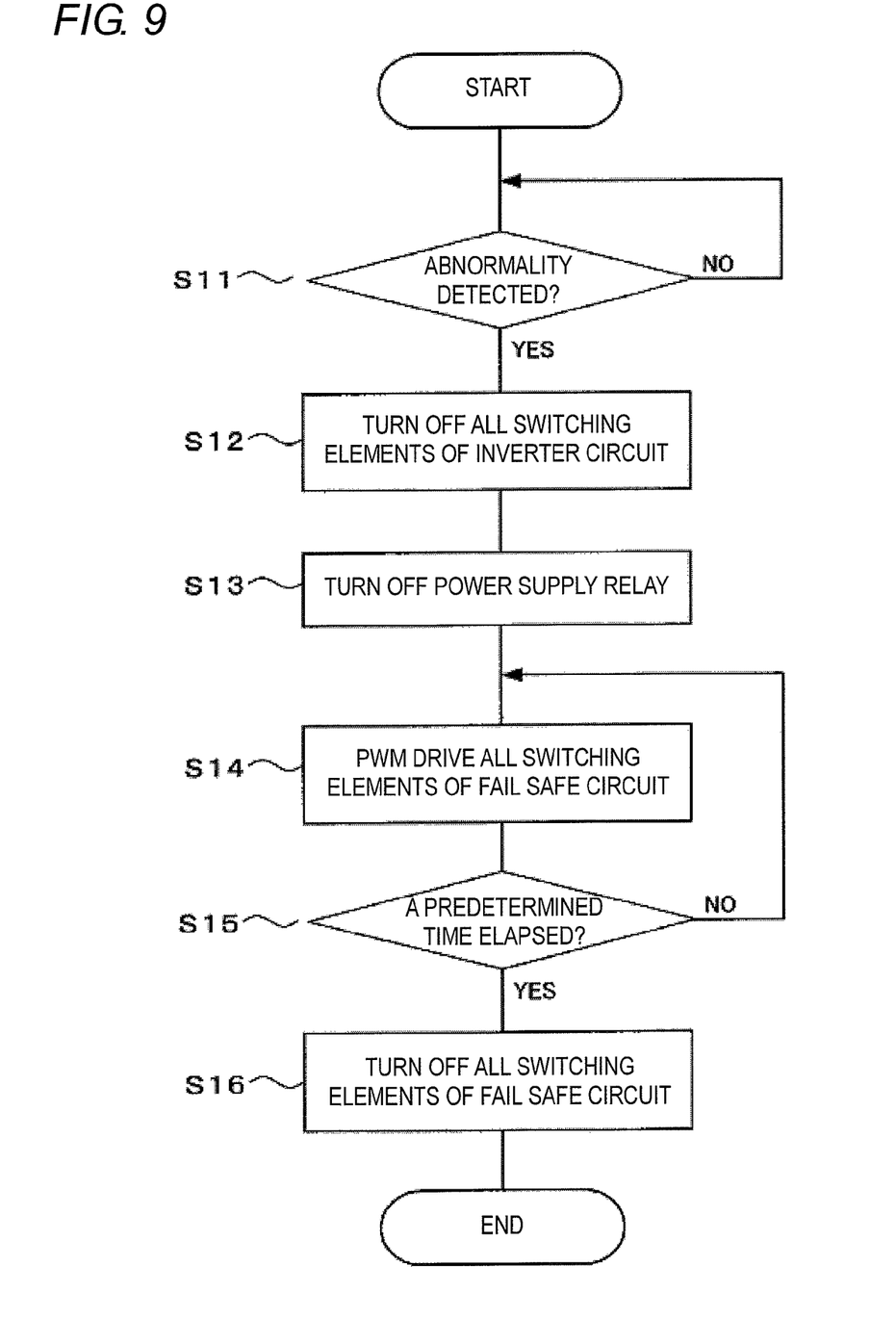
FIG. 9 is a flowchart showing the procedure of the control by the second embodiment.

FIG. 9 is a flowchart showing the procedure of the control according to the second embodiment described above. Each step of the flowchart is executed by the CPU configuring the control unit 1.

In FIG. 9, whether or not the abnormality detector 10 detects abnormalities is monitored in step S11. Step S11 is repeatedly executed if the abnormality detector 10 does not detect an abnormality (step S11: NO), and the process proceeds to steps S12 to S14 if the abnormality detector 10 detects an abnormality (step S11: YES). In step S12, all the switching elements Q1 to Q6 of the inverter circuit 3 are turned OFF, and at the same time, the power supply relay RY is opened (OFF) in step S13. From such time point, all the switching elements Zu, Zv, and Zw of the fail safe circuit 4 are PWM driven in step S14, and the time is measured with a timer (not shown) arranged in the control unit 1. Whether or not the predetermined time T has elapsed is then determined in step S15, where the process returns to step S14 and continues the PWM drive if the predetermined time T has not elapsed (step S15: NO). If the predetermined time T has elapsed (step S15: YES), the process proceeds to step S16 to stop the PWM drive and turn OFF all the switching elements Zu, Zv, and Zw of the fail safe circuit 4.

Similar to the first embodiment, according to the second embodiment, the switching elements Zu, Zv, and Zw of the fail safe circuit 4 can be prevented from being broken by the large spike voltage when an abnormality occurs. In the second embodiment as well, the process of constantly detecting the current value of each phase by arranging the current detection element and comparing the detection current value with the reference value is not necessary since the timing of turning OFF the switching elements Zu, Zv, and Zw merely needs to be controlled, and thus a simple control as shown in FIG. 9 is merely carried out. Other effects of the second embodiment are the same as the first embodiment, and thus the description thereof will be omitted.

The present invention may adopt various embodiments other than those described above. Examples will be given below.

In one or more embodiments described above, the abnormality detector 10 is arranged in the control unit 1 (FIG. 1), but the abnormality detector 10 may be independently arranged separate from the control unit 1. The abnormality detected by the abnormality detector 10 includes not only a short circuit failure but also various abnormalities.

In one or more embodiments described above, the timer (not shown) for measuring the predetermined time T is arranged in the control unit 1, but the timer may be arranged in the fail safe drive unit 5 so that the fail safe drive unit 5 manages the predetermined time T. A delay circuit may be arranged in place of the timer between the control unit 1 and the fail safe drive unit 5, or between the fail safe drive unit 5 and the fail safe circuit 4.

In one or more embodiments described above, the switching elements Zu, Zv, and Zw of the fail safe circuit 4 are simultaneously turned OFF at the time point the predetermined time T has elapsed, but these switching elements may be sequentially turned OFF.

In one or more embodiments described above, the PWM signal having a constant duty is output from the fail safe drive unit 5 (FIG. 7B), but the PWM signal in which the duty becomes smaller with time may be output.

In one or more embodiments described above, the power supply relay RY has been described by way of example for the switch, but a semiconductor switching element for large current switching may be used instead of the power supply relay RY.

In one or more embodiments described above, the N channel MOS-FET is used for the switching element, but a P channel MOS-FET may be used. Other switching elements such as an IGBT (Insulated Gate Bipolar Transistor) may be used instead of the MOS-FET.

In one or more embodiments described above, the three phase motor has been described by way of example for the motor, but one or more embodiments of the present invention may be applied when driving a multiphase motor of four or more phases.

In one or more embodiments described above, the brushless motor has been described by way of example for the motor, but one or more embodiments of the present invention may be applied to a device for driving an inductive motor, a synchronous motor, or the like.

In one or more embodiments described above, an example in which one or more embodiments of the present invention is applied to the motor drive device used for the electric power steering device of the vehicle has been described, but the one or more embodiments of present invention can be applied to the overall motor drive device that includes the fail safe circuit between the inverter circuit and the motor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor drive device comprising:
an inverter circuit, in which at least three sets of a pair of upper and lower arms including a semiconductor switching element on an upper arm and a lower arm is arranged, for supplying voltage to a motor based on ON/OFF operation of each semiconductor switching element by a PWM (Pulse Width Modulation) signal;
an inverter drive unit for outputting the PWM signal to each semiconductor switching element of the inverter circuit;
a fail safe circuit, arranged between the inverter circuit and the motor, including a semiconductor switching element for shielding the voltage supply from the inverter circuit to the motor for each phase;
a fail safe drive unit for outputting a signal for turning ON/OFF the semiconductor switching element of the fail safe circuit;
a control unit for outputting a command signal for commanding the drive of each semiconductor switching element of the inverter circuit to the inverter drive unit, and outputting a command signal for commanding the drive of each semiconductor switching element of the fail safe circuit to the fail safe drive unit; and
an abnormality detecting section for detecting an abnormality;
wherein
when the abnormality detecting section detects an abnormality, the inverter drive unit carries out a control to turn OFF all the semiconductor switching elements of the inverter circuit based on the command signal from the control unit, and thereafter, the fail safe drive unit carries out a control to maintain each semiconductor switching element of the fail safe circuit in an ON state until elapse of a predetermined time, and to turn OFF all the semiconductor switching elements of the fail safe circuit based on the command signal from the control unit at a time point the predetermined time has elapsed, a back electromotive force generated by the motor is absorbed to an inverter circuit side through each semiconductor switching element in the ON state of the fail safe circuit until elapse of the predetermined time.

2. The motor drive device according to claim 1, wherein the fail safe drive unit simultaneously turns OFF all the semiconductor switching elements of the fail safe circuit.

3. The motor drive device according to claim 1, wherein the fail safe drive unit PWM drives each semiconductor switching element of the fail safe circuit until elapse of the predetermined time.

4. The motor drive device according to claim 1, wherein a switch open/close controlled by the control unit is arranged between the inverter circuit and a power supply for supplying power to the inverter circuit; and when the abnormality detecting section detects an abnormality, the control unit outputs a command signal for turning OFF all the semiconductor elements of the inverter circuit to the inverter drive unit, and at the same time, turns the switch to an opened state to electrically separate the inverter circuit and the power supply.

5. The motor drive device according to claim 1, wherein each semiconductor switching element of the inverter circuit and the fail safe circuit is an N channel MOS-FET.

\* \* \* \* \*